United States Patent
Gautama et al.

(10) Patent No.: US 10,255,034 B2
(45) Date of Patent: Apr. 9, 2019

(54) AUDIO PROCESSING CIRCUIT, AUDIO UNIT, INTEGRATED CIRCUIT AND METHOD FOR BLENDING

(71) Applicant: NXP B.V., Eindhoven (NL)

(72) Inventors: Temujin Gautama, Boutersem (BE); Joris Luyten, Begijnendijk (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/691,057

(22) Filed: Aug. 30, 2017

(65) Prior Publication Data

US 2018/0107447 A1 Apr. 19, 2018

(30) Foreign Application Priority Data

Oct. 17, 2016 (EP) .................................. 16194088

(51) Int. Cl.
*H04H 20/26* (2008.01)
*G10H 7/10* (2006.01)
*G06F 3/16* (2006.01)
*H04R 3/04* (2006.01)

(52) U.S. Cl.
CPC ............. *G06F 3/165* (2013.01); *H04H 20/26* (2013.01); *H04R 3/04* (2013.01)

(58) Field of Classification Search
CPC ........ G06F 3/165; H04H 20/26; H04H 40/18; H04R 3/04; G10H 2250/035; G10H 2250/025; G10H 2250/031; G10H 7/10; G10H 2220/425
USPC ...................................................... 381/3, 97
See application file for complete search history.

(56) References Cited

U.S. PATENT DOCUMENTS

| 6,590,944 B1 | 7/2003 | Kroeger | |
|---|---|---|---|
| 2007/0291876 A1 | 12/2007 | Shridhar et al. | |
| 2009/0306972 A1* | 12/2009 | Opitz | H04S 1/007 704/203 |
| 2013/0003801 A1* | 1/2013 | Elenes | H04H 40/18 375/224 |
| 2015/0278686 A1 | 10/2015 | Cardinaux et al. | |

FOREIGN PATENT DOCUMENTS

| JP | 1994301383 | * 10/1994 | ............... G10H 7/10 |
|---|---|---|---|
| JP | 11-184471 A | 7/1999 | |
| JP | 1999184471 | * 7/1999 | ............... G10H 7/08 |

* cited by examiner

*Primary Examiner* — Paul Kim
*Assistant Examiner* — Ubachukwu A Odunukwe
(74) *Attorney, Agent, or Firm* — Rajeev Madnawat

(57) ABSTRACT

An audio processing circuit, audio unit and integrated circuit and method for blending are described. The audio processing circuit comprises: a time-to-frequency domain circuit configured to convert a primary audio signal and a secondary audio signal in a time-domain form and output frequency spectrum representations thereof; a cross-fade magnitude circuit configured to obtain a cross-faded magnitude spectrum representation from the frequency spectrum representations; a cross-fade phase circuit configured to obtain a separate cross-faded phase spectrum representation from the frequency spectrum representations; and a frequency-to-time domain circuit configured to receive the separate cross-faded magnitude and cross-faded phase spectrum representations and output a time domain signal.

16 Claims, 4 Drawing Sheets

AUDIO PROCESSING CIRCUIT, AUDIO UNIT, INTEGRATED CIRCUIT AND METHOD FOR BLENDING

CROSS-REFERENCE TO RELATED APPLICATIONS

This application claims the priority under 35 U.S.C. § 119 of European Patent application no. 16194088.7, filed on Oct. 17, 2016, the contents of which are incorporated by reference herein.

FIELD OF THE INVENTION

The field of the invention relates to audio spectrum blending, and an audio unit, an audio processing circuit and a method for blending. The invention is applicable to, but not limited to, audio sound systems with processing and amplification therein and a method for blending in the frequency-domain.

BACKGROUND OF THE INVENTION

In digital radio broadcasts, signals are encoded in the digital domain, as opposed to traditional analog broadcasts that use amplitude modulated (AM) or frequency modulated (FM) techniques. The received and decoded digital audio signals have a number of advantages over their analog counterparts, such as a better sound quality, and a better robustness to radio interferences, such as multi-path interference, co-channel noise, etc. Several digital radio broadcast systems that have been developed and deployed, such as the Eureka 147 digital audio broadcasting (DAB) system and the in-band on-channel (IBOC) DAB system.

Many radio stations that transmit digital radio also transmit the same radio programme in an analog manner, for example using traditional amplitude modulated (AM) or frequency modulated (FM) transmissions. When two broadcasts for the same radio programme are available (e.g., either two digital broadcasts, or one digital and one analog broadcast, of the same programme), there is the possibility that the radio receiver may switch or cross-fade from one broadcast to the other, particularly when the reception of one is worse than that of the other. Examples of such switching strategies, often referred to as 'blending', are described in U.S. Pat. No. 6,590,944 and US publ. No. 2007/0291876.

When a blending operation from one broadcast technique to another broadcast technique is performed, it is known that artefacts may appear during a cross-fade, if the signals are not perfectly aligned. For example, if there is a small delay between the signals, they will exhibit opposite phases at particular frequencies, and these frequencies will be cancelled out at some point during the cross-fade. This happens even if the delay is as small as two samples.

Furthermore, it is difficult to calculate delays between the signal samples accurately in such real-time systems, in order to determine and correct artifacts due to slightly mis-aligned broadcast signals, particularly if computational resources are restricted. In addition, computing of accurate sampling delay is especially difficult if the signals have different characteristics, e.g., because different pre-processing has been applied. During the cross-fade, there can also be signal cancellation due to phase inversion (i.e., the signals having opposite phase). Next to this, one of the signals may have undergone processing with non-linear phase (e.g., filtering with an infinite impulse response filter), which makes the delay between the signals frequency dependent, and makes it practically impossible to adapt the signals to be perfectly aligned.

Thus, an improved audio processing circuit, audio unit, integrated circuit and method of spectrum blending in an audio unit is needed.

SUMMARY OF THE INVENTION

The present invention provides an audio processing circuit, audio unit, integrated circuit and method of spectrum blending in an audio unit therefor, as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
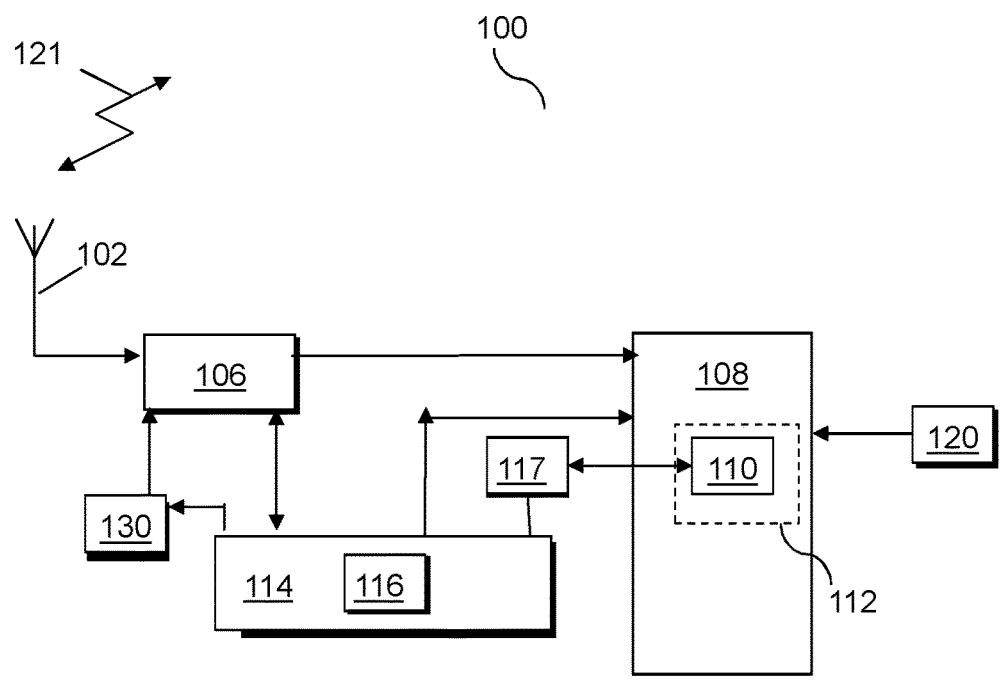
FIG. 1 illustrates a simplified example block diagram of an audio unit in a form of a wireless communication unit, adapted according to example embodiments of the invention.

Examples of the present invention provide a mechanism to perform frequency domain blending by converting time domain signals into the frequency domain and cross-fading the magnitude and phase spectra representations separately. Examples of the invention find applicability in car radios, sound systems, audio units, audio processing units, audio amplifiers, etc. Hereafter, the term 'audio unit' will encompass all such audio devices and audio systems and audio circuits.

Examples of the invention describe an audio processing circuit, as well as an audio unit and an integrated circuit that includes an audio processing circuit. In the context of examples of the invention, the term circuit encompasses one or more components in hardware, or one or more functions in firmware or software that perform a given role. The audio processing circuit comprises: a time-to-frequency domain circuit configured to convert a primary audio signal and a secondary audio signal in a time-domain form and output frequency spectrum representations thereof; a cross-fade magnitude circuit configured to obtain a cross-faded magnitude spectrum representation from at least one of the frequency spectrum representations; a cross-fade phase circuit configured to obtain a separate cross-faded phase spectrum representation from at least one of the frequency spectrum representations; and a frequency-to-time domain circuit configured to receive the separate cross-faded magnitude and cross-faded phase spectrum representations and output a time domain signal. The time-to-frequency and the frequency-to-time domain circuits include well-known signal processing methods, such as windowing and overlap-add that are required for processing signals in the frequency-domain.

In this manner, a blending operation is performed in the frequency domain, rather than the time domain, and cross-fading of the magnitude and phase spectrum representations of the broadcasts is implemented separately, thereby removing a number of the known artefacts that are prevalent during a time-domain blending operation. In this manner, examples may avoid artefacts, such as signal cancellation that are caused by phase differences, which may occur if blending is performed in the time domain. Therefore, since the artefacts are reduced or avoided, it allows for long cross-fade times from one broadcast to the other, which, in turn, results in a smoother transition when, e.g. the two audio broadcasts have different spectral content (e.g. due to different pre-processing, or limitations from the broadcast type).

In some examples, the cross-fade magnitude circuit may be configured to mix a magnitude spectrum representation of the primary audio signal with a magnitude spectrum representation of the secondary audio signal to produce the cross-faded magnitude spectrum representation from at least one of the frequency spectrum representations. In some examples, the cross-fade phase circuit is configured to mix a phase spectrum representation of the primary audio signal and a phase spectrum representation of the secondary audio signal to produce the cross-faded phase spectrum representation from at least one of the frequency spectrum representations. In this manner, the magnitude and phase spectrum representations may be handled separately.

In some examples, the cross-fade phase circuit is configured to mix a frequency spectrum representation of the primary audio signal and a frequency spectrum representation of the secondary audio signal to produce the cross-faded frequency spectrum representation. In some examples the cross-fade phase circuit may be configured to derive the cross-faded phase spectrum from the cross-faded frequency spectrum representation.

In some examples, the cross-fade magnitude circuit may be configured to mix magnitude spectrum representations of the primary audio signal and of the secondary audio signal with a time-varying amplitude mixing factor to produce a cross-faded magnitude spectrum representation from at least one of the frequency spectrum representations, where the time-varying amplitude mixing factor may be controlled to produce a suitable cross-faded magnitude spectrum representation. In some examples, the cross-fade phase circuit is configured to mix phase spectrum representations of the primary audio signal and of the secondary audio signal with a time-varying phase mixing factor to produce a cross-faded phase spectrum representation from at least one of the frequency spectrum representations, where the time-varying phase mixing factor may be controlled to produce a suitable cross-faded phase spectrum representation.

In some examples, the cross-fade magnitude circuit and cross-fade phase circuit may be configured to cross-fade the magnitude and phase spectrum representations separately using different cross-fade times. In this manner, a further disambiguation may be achieved between the magnitude spectra and phase spectra for each of the primary audio signal and secondary audio signal. In some examples, the cross-fade magnitude circuit may be configured to cross-fade the magnitude spectrum representation at a slower cross-fade time than the cross-fade phase circuit to produce the cross-faded phase spectrum representation. In some examples, the magnitude spectrum representation may be cross-faded at a slower cross-fade time than the phase spectrum representation at a factor between one approaching 1:1 and 1:100. In this manner, the magnitude spectrum representation may be blended slower than the phase spectrum representation to better suit human hearing.

In some examples, the primary audio signal may be received from a first broadcast audio signal and the secondary audio signal may be received from a second different broadcast audio signal, wherein the first broadcast audio signal and second broadcast audio signal are available simultaneously. In this manner, the concepts herein described may be applied to any blending between known broadcast techniques, for example it can be applied in the context of simulcasts, where the same audio content is received from multiple broadcasts (e.g., FM and DAB) and the two audio signals are available simultaneously to the system.

In some examples, the concepts herein described may be used as part of a hybrid radio that can simultaneously receive an FM and a digital radio broadcast of the same programme. The effect will be to reduce artefacts due to signal cancellation caused by phase differences.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Referring first to FIG. 1, an example of an audio unit 100, such as a radio receiver, adapted in accordance with some examples, is shown. Purely for explanatory purposes, the radio receiver is capable of receiving wireless signals carrying digital audio broadcast or analog frequency modulated or amplitude modulated signals. The radio receiver contains an antenna 102 for receiving transmissions 121 from a broadcast station. One or more receiver chains, as known in the art, include receiver front-end circuitry 106, effectively providing reception, frequency conversion, filtering and intermediate or base-band amplification. In radio receiver, receiver front-end circuitry 106 is operably coupled to a frequency generation circuit 130 that may include a voltage controlled oscillator (VCO) circuit and PLL arranged to provide local oscillator signals to down-convert modulated signals to a final intermediate or baseband frequency or digital signal.

In some examples, such circuits or components may reside in signal processing module 108, dependent upon the specific selected architecture. The receiver front-end circuitry 106 is coupled to a signal processing module 108

(generally realized by a digital signal processor (DSP)). A skilled artisan will appreciate that the level of integration of receiver circuits or components may be, in some instances, implementation-dependent.

A controller 114 maintains overall operational control of the radio receiver, and in some examples may comprise time-based digital functions (not shown) to control the timing of time-dependent signals, within the radio receiver. The controller 114 is also coupled to the receiver front-end circuitry 106 and the signal processing module 108. In some examples, the controller 114 is also coupled to a timer 117 and a memory device 116 that selectively stores operating regimes, such as decoding/encoding functions, and the like.

A single processor may be used to implement a processing of received broadcast signals, as shown in FIG. 1. Clearly, the various components within the radio receiver 100 can be realised in discrete or integrated component form, with an ultimate structure therefore being an application-specific or design selection.

Figure 2:
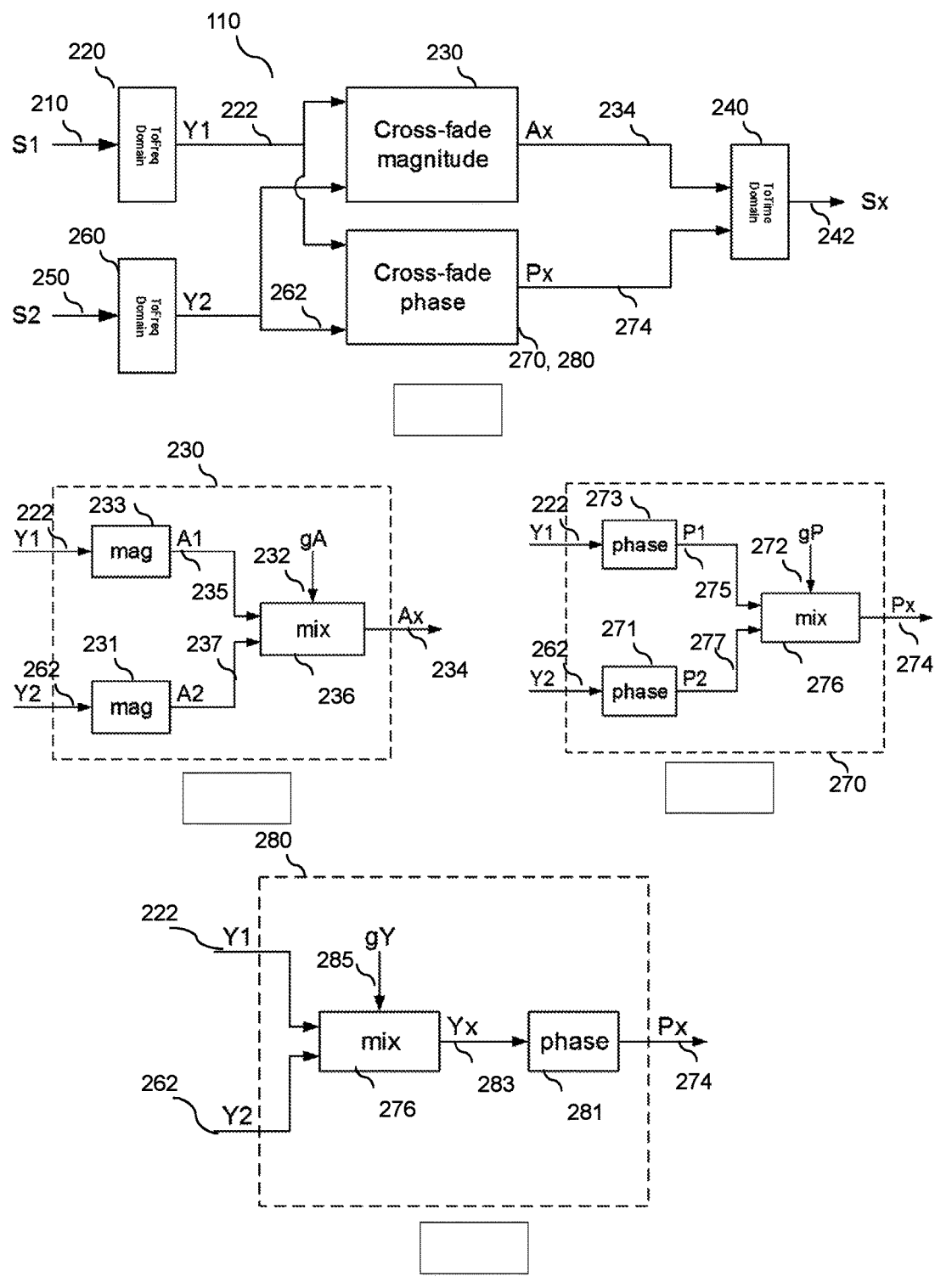
FIG. 2 illustrates a simplified example block diagram of an audio processing circuit, according to example embodiments of the invention.

In accordance with some example embodiments, an audio signal processing circuit 110 has been adapted to perform a blending operation from one received broadcast signal to another in the frequency domain, which reduces or minimises or removes artefacts that may appear during a cross-fade, should the signals be not perfectly aligned. If there is a small delay between the broadcast signals, they may exhibit opposite phases at particular frequencies, resulting in attenuations or cancellations during a time-domain cross-fade. In these examples, as described further with respect to FIG. 2 and FIG. 3, it is prevented that these frequencies are cancelled out at some point during the cross-fade. This prevention of signals/frequencies being cancelled happens even if the delay between the broadcast signals is as small as two samples.

Figure 3:
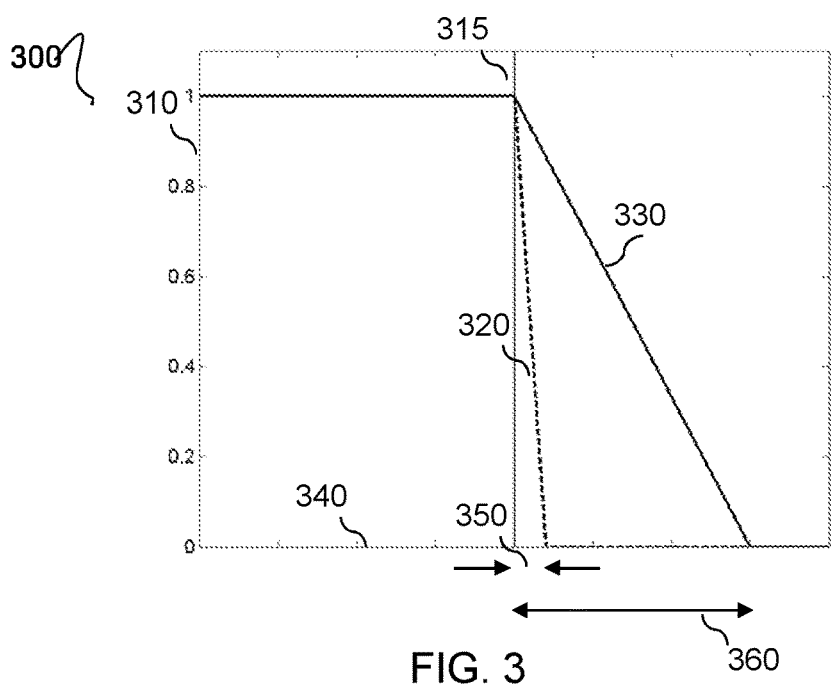
FIG. 3 illustrates an example of a change of mixing factors over time for example as employed in the audio processing circuit of FIG. 2, according to example embodiments of the invention.

In some examples, the cross-fade time applied to magnitude spectrum representation may be configured to be slower than the cross-fade time applied to phase spectrum representation, as controlled by setting a parameter in the corresponding DSP 108 that, say, controls a transition slope, as shown in FIG. 3.

A skilled artisan will appreciate that the level of integration of receiver circuits or components may be, in some instances, implementation-dependent. In some examples, the audio signal processing circuit 110 may be implemented in an integrated circuit 112, which may include one or more other signal processing circuits.

Clearly, the various components within the audio unit 100 can be realised in discrete or integrated component form, with an ultimate structure therefore being an application-specific or design selection.

Referring now to FIG. 2a, a more detailed block diagram of an example audio processing circuit, such as the audio processing circuit 110 of FIG. 1, is illustrated. The two received broadcast audio signals in the input are represented respectively by for a primary signal S1 210 and for a secondary signal S2 250. It is assumed that appropriate delays have been applied by a signal processing circuit prior to input to the audio processing circuit 110, so that any remaining delay between for the primary signal S1 210 and for the secondary signal S2 250 is limited to a small number of samples.

First, in this example, a frequency domain representation of the respective primary signal S1 210 and secondary signal S2 250 is obtained by inputting the signals to respective time-to-frequency domain circuits 220, 260. In some examples, a single time-to-frequency domain circuit may be employed. In the frequency domain, the primary signal S1 210 and secondary signal S2 250 are represented by their (complex-valued) frequency spectra, Y1(ω) 222 for primary signal S1 210 and Y2(ω) 262 for secondary signal S2 250, respectively, where ω represents frequency (in the remainder of the text, the dependence on ω has been omitted for ease of notation).

The cross-faded amplitude spectrum representation Ax 234 is computed in the 'cross-fade magnitude' circuit 230 using at least one of the frequency spectrum representations Y1 222 and Y2 262. The cross-faded phase spectrum representation Px 274 is computed in the 'cross-fade phase' circuit 270 (or 280), also using at least one of the frequency spectrum representations Y1 222 and Y2 262. The cross-faded magnitude spectrum representation 234 and phase spectrum representation 274 are combined into a cross-faded (complex-valued) frequency spectrum representation. Output signal Sx 242 is obtained by converting the cross-faded frequency spectrum representation to the time domain in the frequency-to-time domain circuit 240.

One example of the cross-fade magnitude circuit 230 is also shown in greater detail. The amplitude spectrum representations of Y1 222 and Y2 262 are computed in respective magnitude computing circuits/functions 233, 231, yielding A1 235 and A2 237. The cross-faded magnitude spectrum representation Ax 234 is computed in a first mixing circuit 236. In this example, it is obtained as:

$$Ax = gA \cdot A1 + (1-gA) \cdot A2 \quad [1]$$

where gA 232 is an amplitude mixing factor in the range [0;1].

A first example of a cross-fade phase circuit 270 is also shown in greater detail. The phase spectrum representations of Y1 222 and Y2 262 are computed in respective phase computing circuits/functions 273, 271, yielding P1 275 and P2 277. The cross-faded phase spectrum representation Px 274 is computed in a second mixing circuit 276. It is obtained as:

$$Px = gP \cdot P1 + (1-gP) \cdot P2 \quad [2]$$

where gP 272 is a phase mixing factor in the range [0;1].

A yet further alternative example of a cross-fade phase circuit 280 is also shown in greater detail. The phase spectrum representations of Y1 222 and Y2 262 are input into an alternative mixing circuit 276 that is configured to compute cross-faded (complex-valued) frequency spectrum representation Yx 283. The cross-faded (complex-valued) frequency spectrum representation Yx 283 is obtained as:

$$Yx = gY \cdot Y1 + (1-gY) \cdot Y2 \quad [3]$$

where gY 285 is a complex spectrum mixing factor in the range [0;1]. The cross-faded phase spectrum representation Px 274 is the phase spectrum of the cross-faded (complex-valued) frequency spectrum representation Yx.

Although examples of the invention are described with respect to a blending operation from a primary audio signal to a secondary audio signal, it is envisaged hat the same process is followed when blending a secondary audio signal to a primary audio signal, as blending encompasses transitioning from one signal to the other. As such, the terms 'primary' and 'secondary' do not impart any preferential meaning to the audio signals, and in other examples, a first and second audio signal may be blended.

Referring now to FIG. 3, a graphical example 300 associated with applying a variable mixing factor, over time, is illustrated, according to example embodiments of the invention. In this graphical example 300, a variable mixing factor follows a blending operation that transitions the magnitude mixing factor gA 330 from '1' to '0' following a given slope, and transitions the phase mixing factor gP 320 from '1' to '0' following a faster slope, over time 350. Here, a mixing factor for gA 330 and gP 320 commences with a '1' where the output 310 is wholly a 'primary' signal, and transitions over time to a mixing factor for gA 330 and gP 320 of a '0' where the output is wholly a 'secondary' signal, when the blending operation is no longer in progress. Before the blending operation, the mixing factors are both an output '1', which in this example indicates that the blending operation will be from the primary signal to the secondary signal. The initiation of the blending operation is represented by the thin solid vertical line 315. A skilled artisan will appreciate that in the alternative cross-fade phase circuit 280 of FIG. 2, gY 285 may follow substantially the same slope transition as phase mixing factor gP 320 of FIG. 3.

Thus, when a blending operation (from a primary to a secondary signal) is initiated by the host application, the mixing factors gA and gP change from an output '1' to an output '0' over time. If this change is instantaneous, the blending operation simply switches from primary to secondary signal, which leads to undesirable artefacts. In accordance with examples of the invention, by changing the value more gradually during the blending operation, as shown, a smoother transition from the primary to the secondary signal is obtained. The time taken to change the mixing factor from '1' to '0' is called the 'cross-fade' time. For the phase spectrum representation a small cross-fade time 350, e.g., of the order of 0.1 seconds, may be used, so that the phase information in the output quickly switches from the primary to the secondary signal. For the magnitude spectrum representation, a longer cross-fade time 360, e.g., of the order of 3 seconds, may be used, in order to obtain a smoother transition from primary signal to secondary signal with respect to the magnitude information, to which the human auditory system is more sensitive. Although this example proposes a ratio of 30:1 between the magnitude spectrum representation cross-fade time 360 and the phase spectrum representation cross-fade time 350, it is envisaged that any suitable ratio of different cross-fade times may be employed, e.g. between one approaching 1:1 and 100:1.

Thus, in examples of the invention, the cross-faded phase may be performed quickly, as either phase (from the primary audio signal or the secondary audio signal) is suitable. In some examples, the magnitude spectrum representations may be cross-faded more slowly, to facilitate smoother transitions from one to the other.

In some examples, it is envisaged that the magnitude spectrum may be cross-faded and the phase spectrum may be switched instantaneously. In this example, only one cross-faded signal may be used, e.g. the cross-faded magnitude spectrum representation, but not both. Although this may generate some artefacts, such artefacts in some applications may be tolerable, and would still yield better results than the state-of-the-art.

In some examples, it is envisaged that the cross-fade times may be dependent upon the type of broadcast signals. In one example, it is envisaged that a transition from, say, FM to DAB may be configured as faster than from DAB to FM. In some examples, this may configured as a user preference via a user interface (not shown) on the audio unit.

Figure 4:
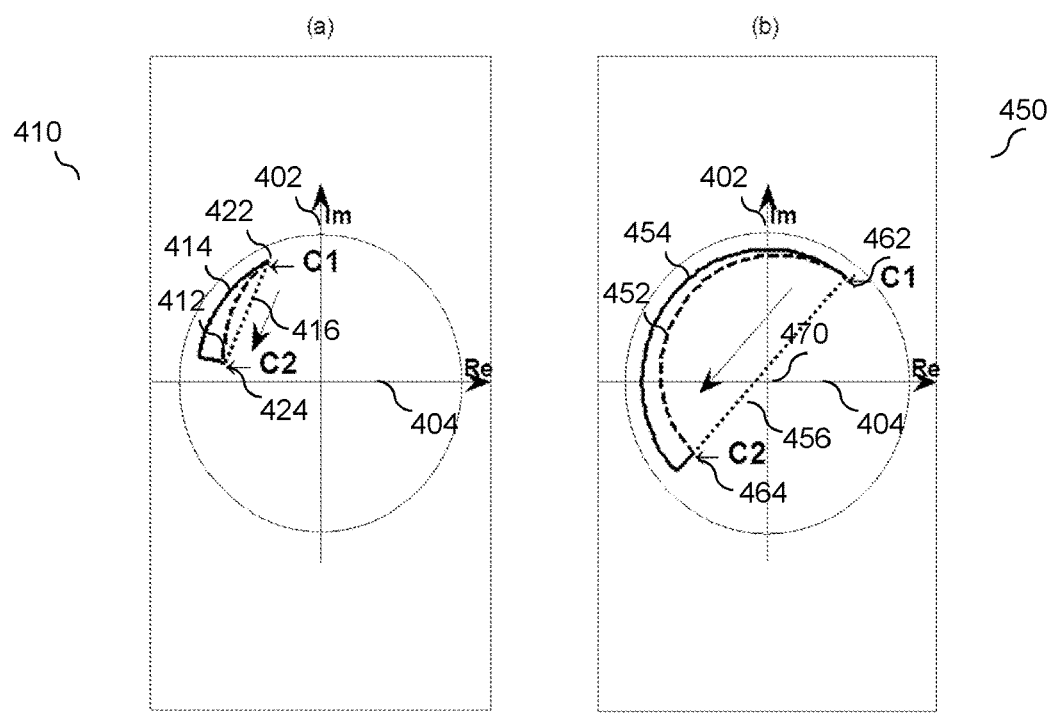
FIG. 4 illustrates an example of a change of magnitude and phase of a broadcast signal during a cross-fade in both time domain (dotted line) and frequency domain (dashed and solid line) for both (a) small phase difference, and (b) opposite phase, according to example embodiments of the invention.

FIG. 4 illustrates a comparison of an evolution of magnitude and phase of a signal during a cross-fade between known time-domain cross-fading 416, 456 and examples of the invention that support frequency-domain cross-fading 412, 414, 452, 454 of a single complex-valued frequency component. The comparison is provided for both: (a) small phase difference 410, and (b) opposite phase 450.

In accordance with some example embodiments, performing the cross-fade in the frequency domain and on magnitude spectrum representation separately from the cross-fade performed on phase spectrum representation may avoid artefacts, such as signal cancellation caused by phase differences. It is desired to have a constant audio level during the blending operation. The signals in FIG. 4 are represented by vectors C1 422, 462 and C2 424, 464 in the complex plane, with real 404 and imaginary 402 axis representing complex numbers with a given magnitude and phase. Assuming that a linear cross-fade is used, the transition from C1 422, 462 to C2 424, 464 follows a linear curve in the complex plane. The dotted lines 416, 456 in FIG. 4 indicate how the vector changes when transitioning from C1 422, 462 to C2 424, 464 via a known cross-fade in the time domain. In the known time domain cross-fade 416, with a small phase difference 410, the magnitude of the broadcast signal may drop during the cross-fade. Also, in the known time domain cross-fade 456, with an opposite phase 450, the magnitude of the broadcast signal may drop to nearly zero 470 during the cross-fade. These undesirable artefacts are removed or reduced by employing frequency-domain cross-fades.

If magnitude and phase are cross-faded separately, as indicated by the dashed line 412, 452 (with identical cross-fade times for magnitude and phase) and the solid line 414, 454 (short cross-fade time for phase, longer cross-fade time for magnitude), the magnitude monotonically increases or decreases from the magnitude of component C1 to the magnitude of component C2. The magnitude of the cross-faded signal is then always greater than or equal to the smaller of the input signal magnitudes. If the phase difference between C1 422 and C2 424 is limited, as in 410, the magnitude does not drop significantly during the cross-fade as shown with the curve 414. Also, if C1 462 and C2 464 are (or are nearly) in counter-phase, as in 450, the magnitude of the cross-faded signal does not approach zero 470 at any point during the cross-fade, as the magnitude follows curve 454.

Figure 5:
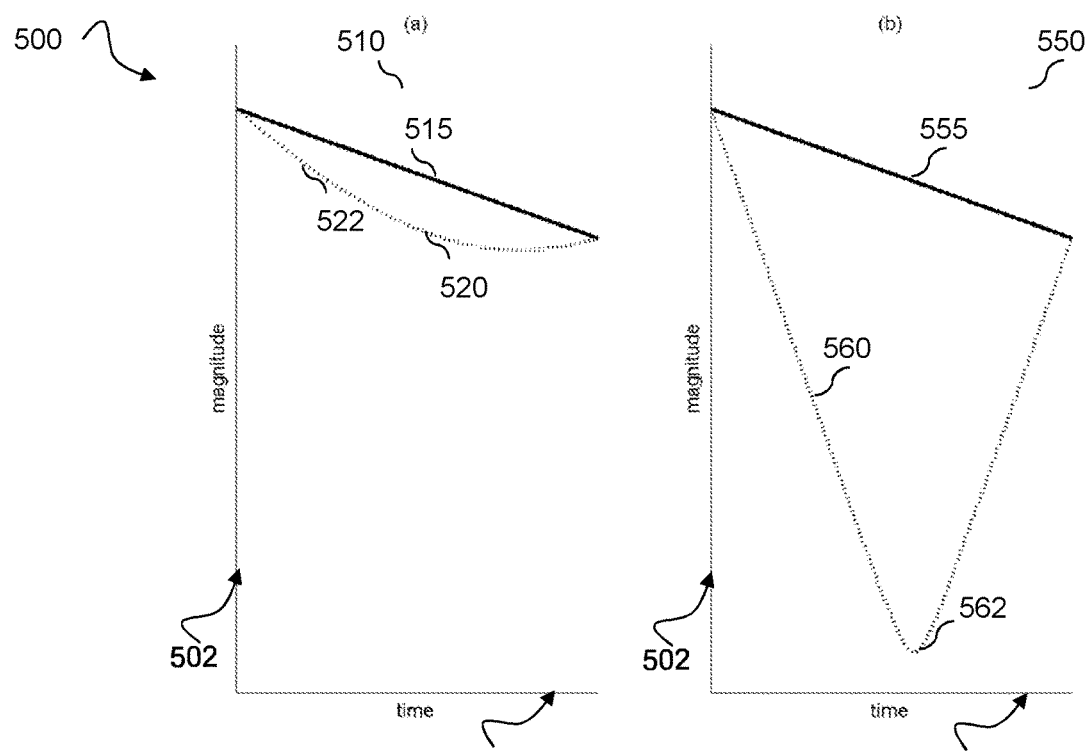
FIG. 5 illustrates an example of a change of magnitude during cross-fade in time domain (dotted line) and frequency domain (solid line) for both (a) small phase difference, and (b) opposite phase, according to example embodiments of the invention.

Referring now to FIG. 5, an example of an evolution of magnitude during cross-fade in time domain 520, 560 and frequency domain 515, 555 for FIG. 4 is illustrated. Again the examples graphs illustrate both (a) small phase difference 510, and (b) opposite phase 550. As illustrated, when there is a small phase difference 510, the frequency domain cross-fade with separate magnitude and phase 515 shows a smooth transition of magnitude 502 over time 504, whereas the time domain cross-fade 520 exhibits a magnitude drop 522. This is exacerbated when there are opposing phases 550, where again the frequency domain cross-fade with separate magnitude and phase 555 shows a smooth transition of magnitude 502 over time 504, whereas the time domain cross-fade 560 exhibits a large magnitude drop 562 in the blended audio signal. In FIG. 5, the dashed lines 520, 560 and solid lines 515, 555 coincide because the phase cross-fade time does not affect the magnitude.

Figure 6:
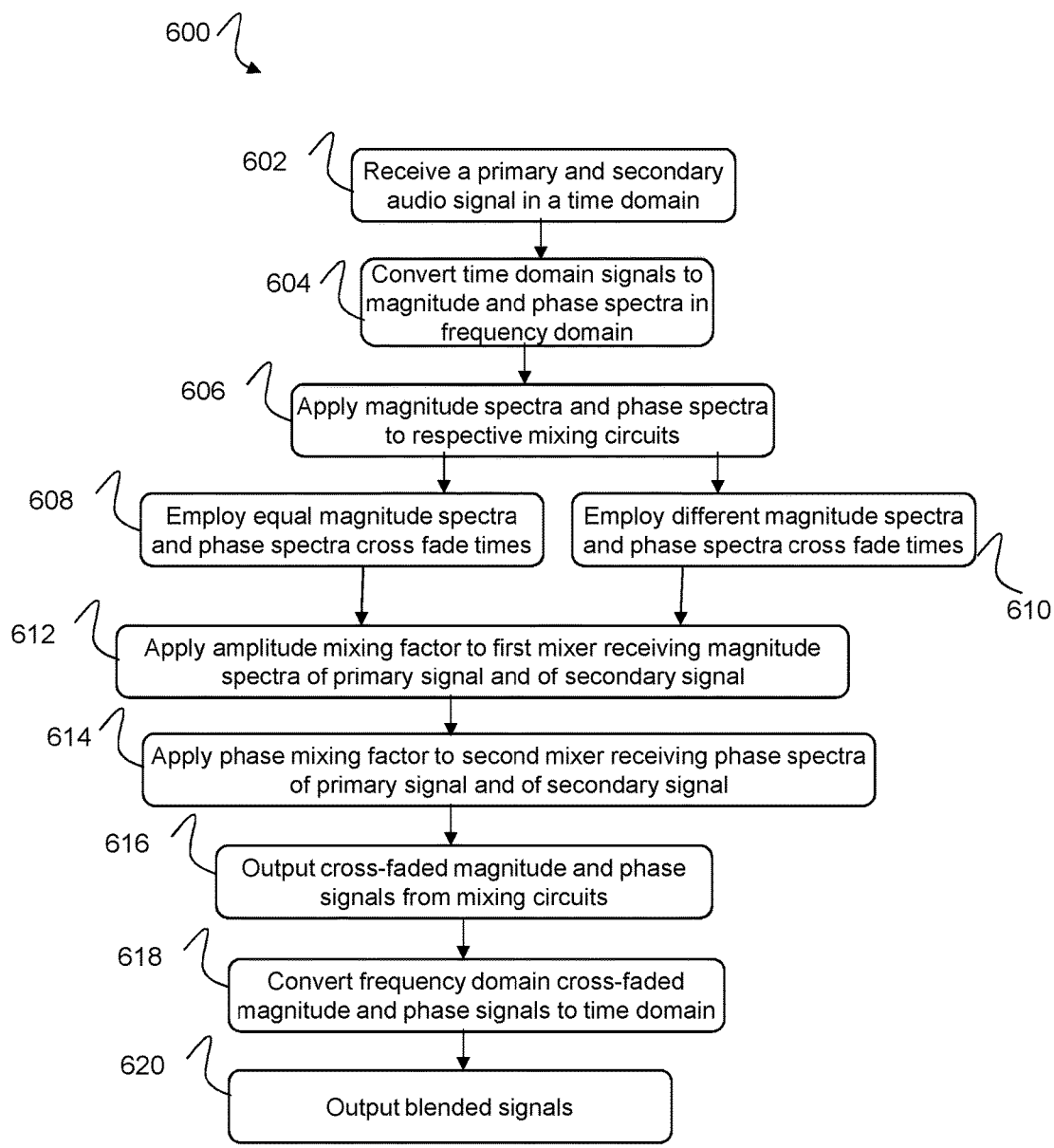
FIG. 6 illustrates an example flow chart for frequency domain blending, according to example embodiments of the invention.

FIG. 6 illustrates an example flowchart 600 for spectrum blending. At 602, primary and secondary receive broadcast audio time-domain signals are received. At 604, the time domain signals are converted to magnitude and phase spectrum representations in the frequency domain. At 606 magnitude and phase spectrum representations from primary and secondary signals are applied to respective mixing circuits.

In this example, a choice is made as to whether to employ equal magnitude and phase spectrum representation cross fade times in 608 or whether to employ different magnitude spectrum and phase spectrum representation cross fade times 610.

At 612, an amplitude mixing factor is applied to a first mixer that receives the magnitude spectrum representation of the primary signal and of the secondary signal. At 614, a phase mixing factor is applied to a second mixer that receives the phase spectrum representation of the primary signal and of the secondary signal. In some examples, the amplitude mixing factor and the phase mixing factor are time dependent, and are adapted over time. In some examples, the mixing factors are varied according to whether equal magnitude and phase spectrum representation cross fade times are employed in 608 or whether different magnitude spectra and phase spectra cross fade times are employed in 610.

At 616, cross-faded magnitude and phase spectrum representations are output from the mixing circuits. At 618, the frequency domain cross-faded magnitude and phase spectrum representations are converted to the time domain, and time domain signals output at 620.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognise that the architectures depicted herein are merely exemplary, and that in fact many other architectures can be implemented that achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognise that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented on a single integrated circuit, for example in software in a digital signal processor (DSP) as part of a radio frequency integrated circuit (RFIC).

Alternatively, the circuit and/or component examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired sampling error and compensation by operating in accordance with suitable program code, such as minicomputers, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritisation of such elements. The mere fact that certain measures are recited in mutually different claims does not indicate that a combination of these measures cannot be used to advantage.

The invention claimed is:

1. An audio processing circuit comprising:
a time-to-frequency domain circuit configured to convert a primary audio signal and a secondary audio signal, wherein the primary audio signal is FM radio and the secondary audio signal is digital radio, in a time-domain form and output frequency spectrum representations thereof;
a cross-fade magnitude circuit configured to obtain a cross-faded magnitude spectrum representation from at least one of the frequency spectrum representations;
a cross-fade phase circuit configured to obtain a separate cross-faded phase spectrum representation from at least one of the frequency spectrum representations, wherein a determination is made whether to apply equal or different magnitude and phase spectrum representation cross fade times; and a frequency-to-time domain circuit configured to receive the separate cross-faded magnitude and cross-faded phase spectrum representations and output a time domain signal.

2. The audio processing circuit of claim 1, wherein the cross-fade magnitude circuit is configured to mix a magnitude spectrum representation of the primary audio signal with a magnitude spectrum representation of the secondary audio signal to produce the cross-faded magnitude spectrum representation from the frequency spectrum representations.

3. The audio processing circuit of claim 2, wherein the cross-faded magnitude spectrum representation is mixed with a time-varying amplitude mixing factor to produce a cross-faded magnitude signal.

4. The audio processing circuit of claim 1, wherein the cross-fade phase circuit is configured to mix a phase spectrum representation of the primary audio signal and a phase spectrum representation of the secondary audio signal to produce the cross-faded phase spectrum representation from the frequency spectrum representations.

5. The audio processing circuit of claim 4, wherein the cross-faded phase spectrum representation is mixed with a time-varying phase mixing factor to produce a cross-faded phase spectrum representation.

6. The audio processing circuit of claim 1, wherein the cross-fade phase circuit comprises:

a mixing circuit configured to mix the frequency spectrum representations of the primary audio signal and of the secondary audio signal with a time-varying complex spectrum mixing factor, and to derive the phase spectrum representation of the output to produce a cross-faded phase spectrum representation.

7. The audio processing circuit of claim 1, wherein the cross-fade magnitude circuit and cross-fade phase circuit are configured to cross-fade the magnitude and phase spectrum representations using different cross-fade times.

8. The audio processing circuit of claim 7, wherein the cross-fade magnitude circuit is configured to cross-fade the magnitude spectrum representation at a slower cross-fade time than the cross-fade phase circuit that is configured to cross fade the phase spectrum representation.

9. The audio processing circuit of claim 8, wherein the cross-fade magnitude circuit is configured to cross-fade the magnitude spectrum representation at a slower cross-fade time than the cross-fade phase circuit is configured to cross fade the phase spectrum representation at a factor between one approaching 1:1 and 1:100.

10. The audio processing circuit of claim 9, wherein the cross-fade magnitude circuit is configured to cross-fade the magnitude spectrum representation at the slower cross-fade time than the cross-fade phase circuit is configured to cross fade the phase spectrum representation at a factor of substantially 1:30.

11. The audio processing circuit of claim 1, wherein the cross-fade magnitude circuit and cross-fade phase circuit are configured to cross-fade the magnitude and phase spectrum representations separately using equal cross-fade times.

12. The audio processing circuit of claim 1, wherein the primary audio signal is received from a first broadcast audio signal and the secondary audio signal is received from a second different broadcast audio signal, wherein the first broadcast audio signal and second broadcast audio signal are available simultaneously and include at least one of: an amplitude or frequency modulated broadcast, a digital audio broadcast.

13. A radio receiver that comprises:

a time-to-frequency domain circuit configured to convert a primary audio signal and a secondary audio signal, wherein the primary audio signal is FM radio and the secondary audio signal is digital radio, in a time-domain form and output frequency spectrum representations thereof;

a cross-fade magnitude circuit configured to obtain a cross-faded magnitude spectrum representation from at least one of the frequency spectrum representations;

a cross-fade phase circuit configured to obtain a separate cross-faded phase spectrum representation from at least one of the frequency spectrum representations, wherein a determination is made whether to apply equal or different magnitude and phase spectrum representation cross fade times; and a frequency-to-time domain circuit configured to receive the separate cross-faded magnitude and cross-faded phase spectrum representations and output a time domain signal.

14. An integrated circuit for a radio receiver that includes an audio processing circuit that comprises:

a time-to-frequency domain circuit configured to convert a primary audio signal and a secondary audio signal, wherein the primary audio signal is FM radio and the secondary audio signal is digital radio, in a time-domain form and output frequency spectrum representations thereof;

a cross-fade magnitude circuit configured to obtain a cross-faded magnitude spectrum representation from at least one of the frequency spectrum representations;

a cross-fade phase circuit configured to obtain a separate cross-faded phase spectrum representation from at least one of the frequency spectrum representations, wherein a determination is made whether to apply equal or different magnitude and phase spectrum representation cross fade times; and a frequency-to-time domain circuit configured to receive the separate cross-faded magnitude and cross-faded phase spectrum representations and output a time domain signal.

15. A method of spectrum blending in a radio receiver, the method comprising:

receiving, in the radio receiver, a primary audio signal and a secondary audio signal, wherein the primary audio signal is FM radio and the secondary audio signal is digital radio, in a time-domain form;

converting, in the radio receiver, the primary audio signal and the secondary audio signal into frequency spectrum representations thereof;

obtaining, in the radio receiver, a cross-faded magnitude spectrum representation and a separate cross-faded phase spectrum representation from at least one of the frequency spectrum representations;

determining whether to apply equal or different magnitude and phase spectrum representation cross fade times;

converting, in the radio receiver, the cross-faded magnitude spectrum representation and separate cross-faded phase spectrum representation into a time domain signal; and outputting, from the radio receiver, blended time-domain signals.

16. The method of claim 15, wherein obtaining the cross-faded magnitude spectrum representation comprises:
mixing a magnitude spectrum representation of the primary audio signal with a magnitude spectrum representation of the secondary audio signal to produce the cross-faded magnitude spectrum representation; and obtaining the separate cross-faded phase spectrum representation comprises:
mixing a phase spectrum representation of the primary audio signal with a phase spectrum representation of the secondary audio signal to produce the cross-faded phase spectrum representation.

\* \* \* \* \*